Patented May 7, 1935

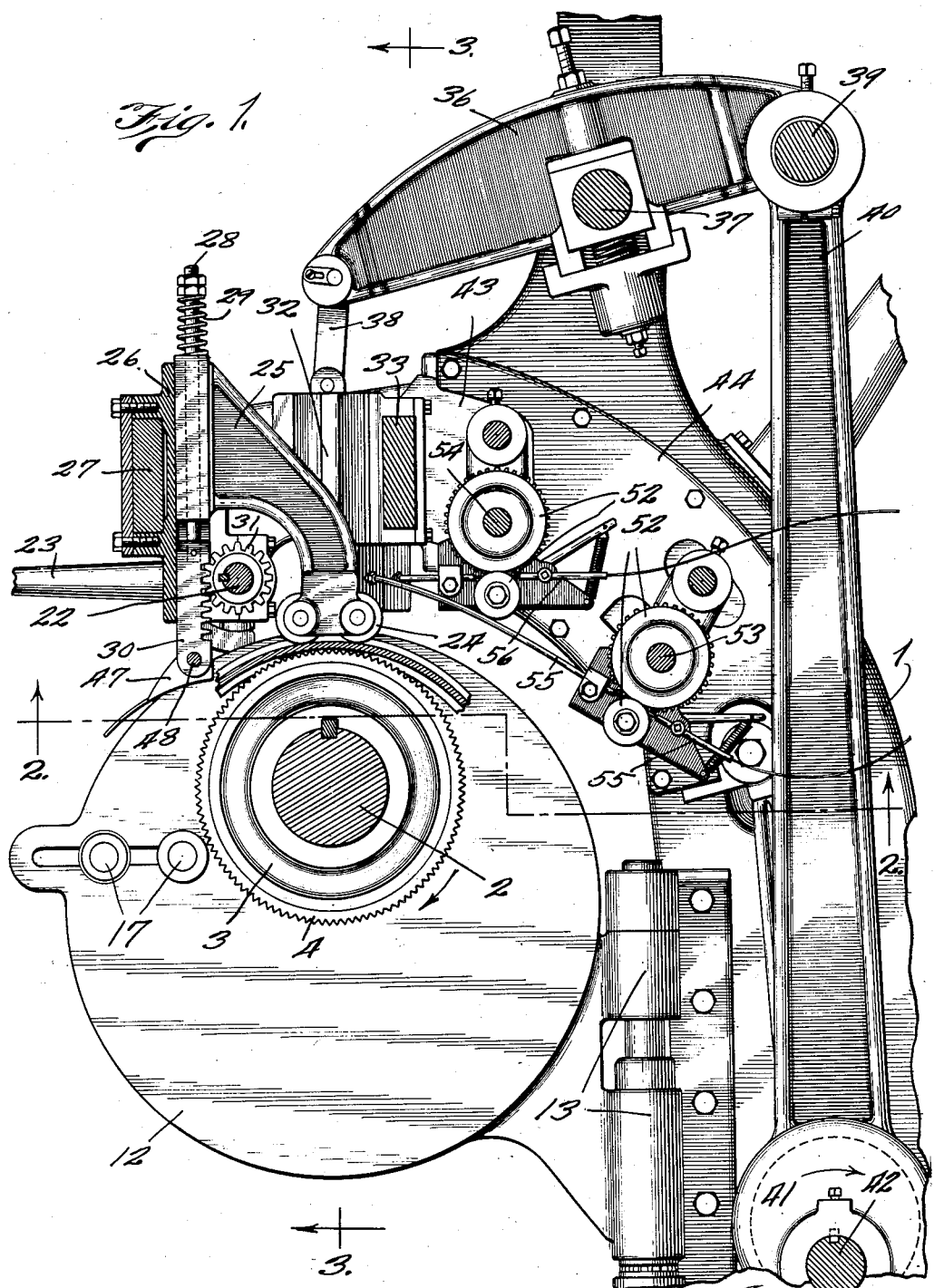

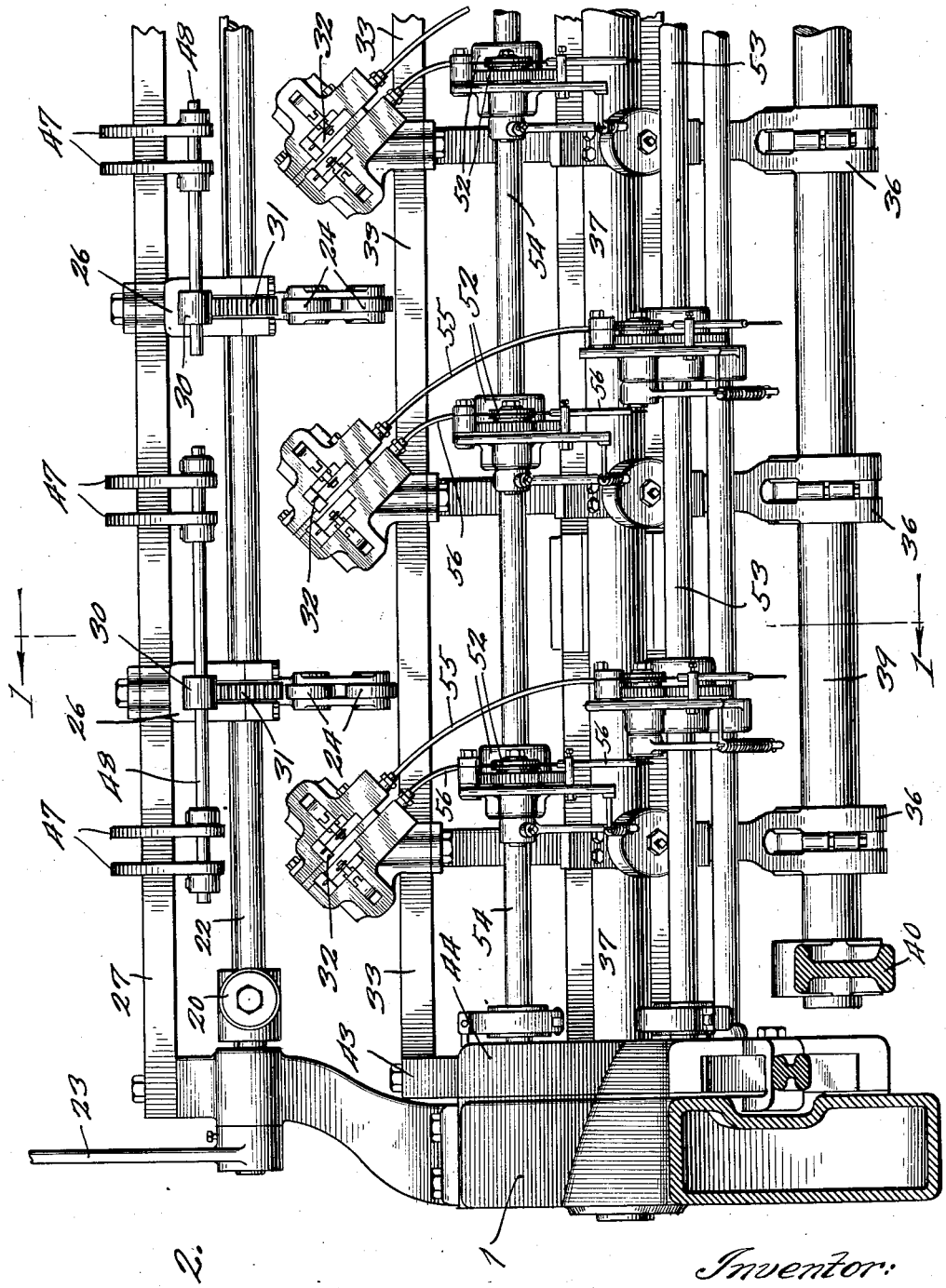

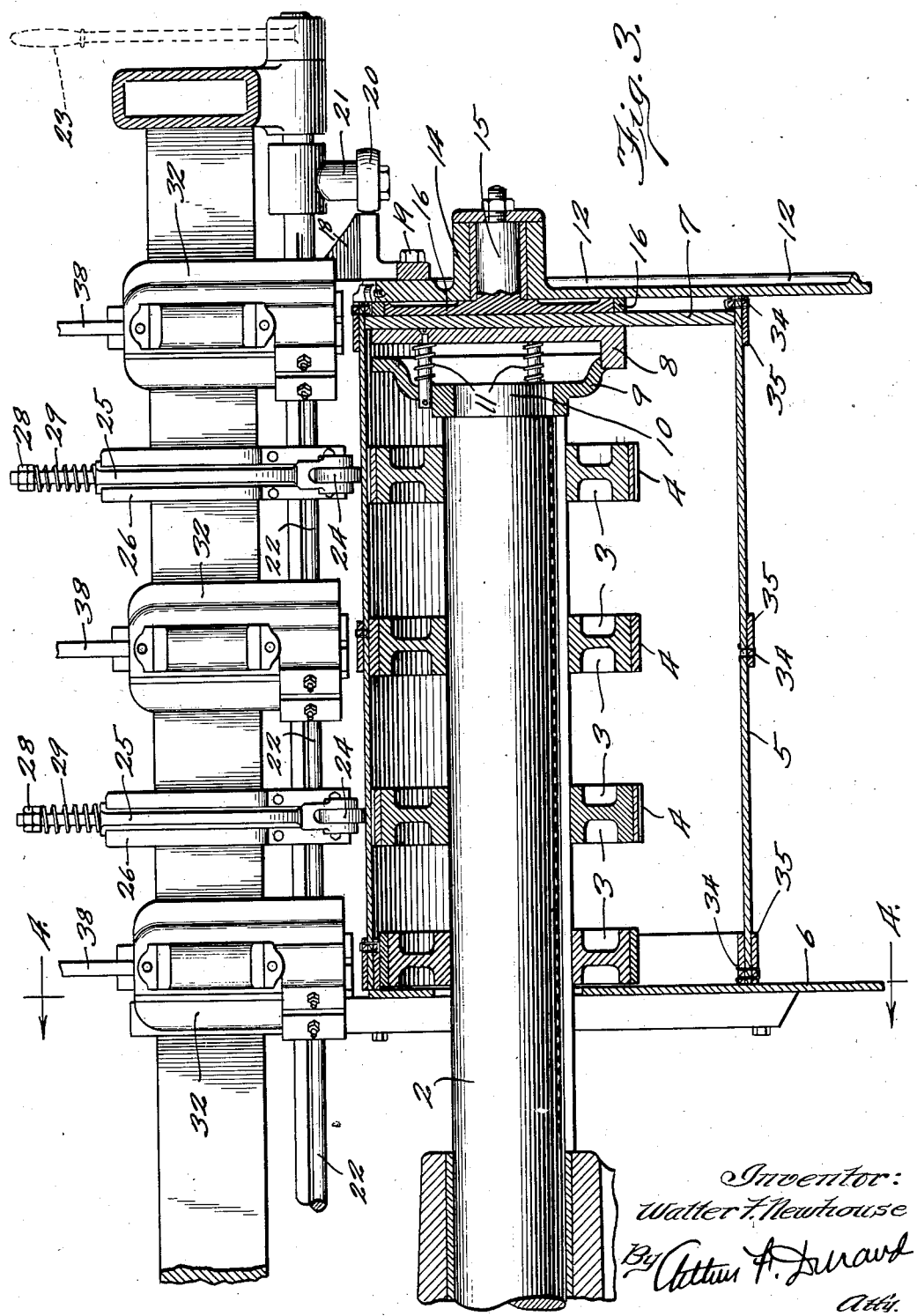

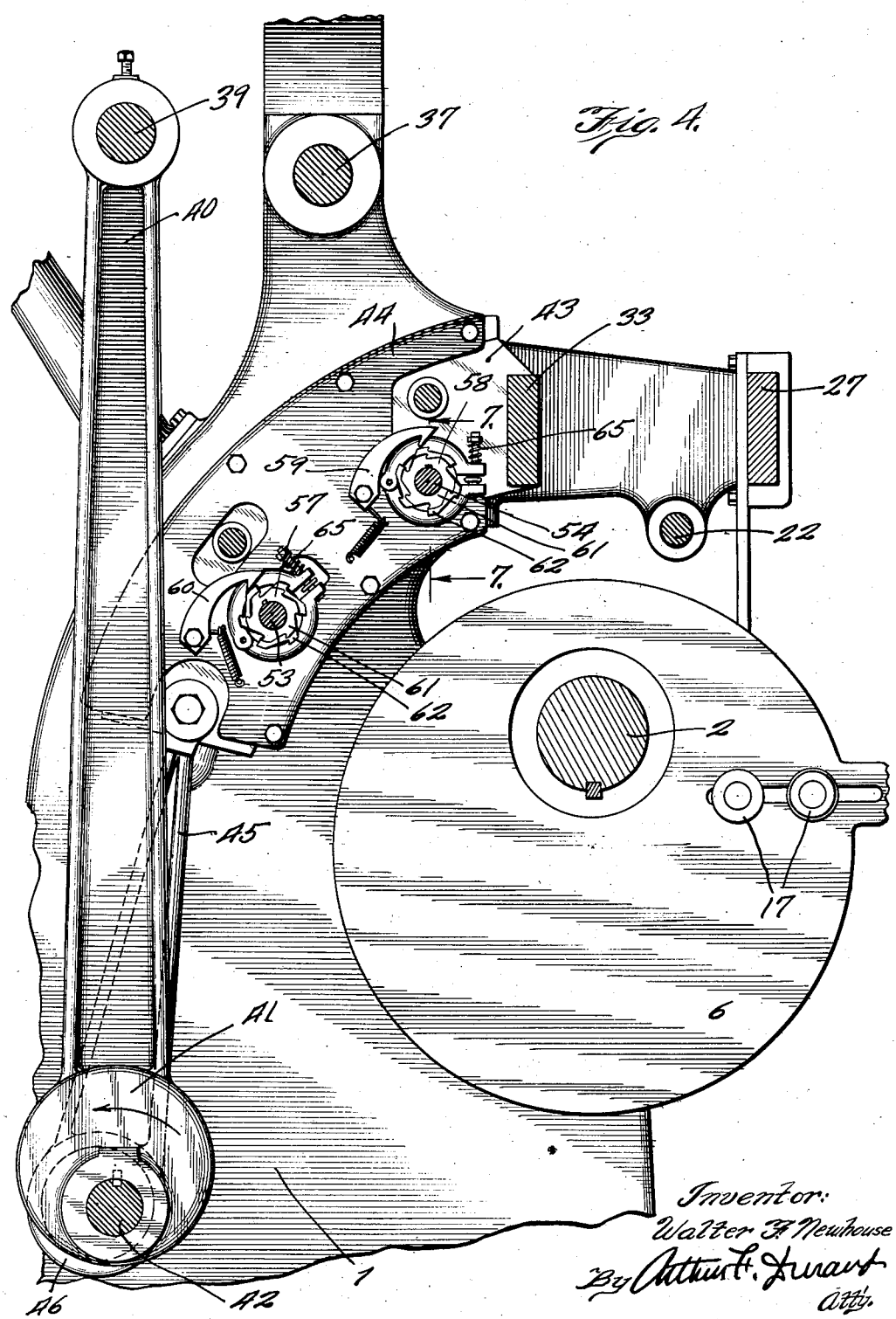

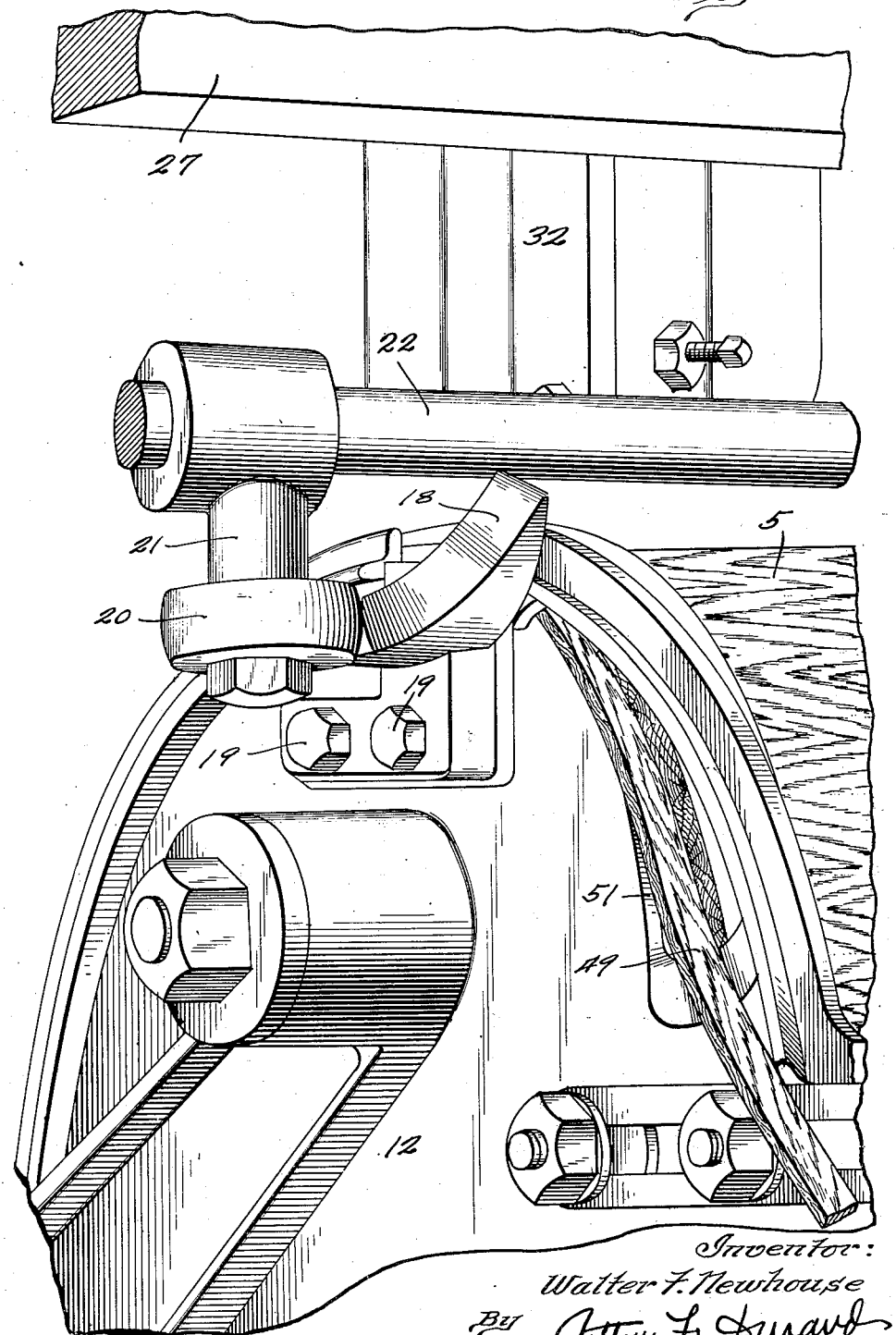

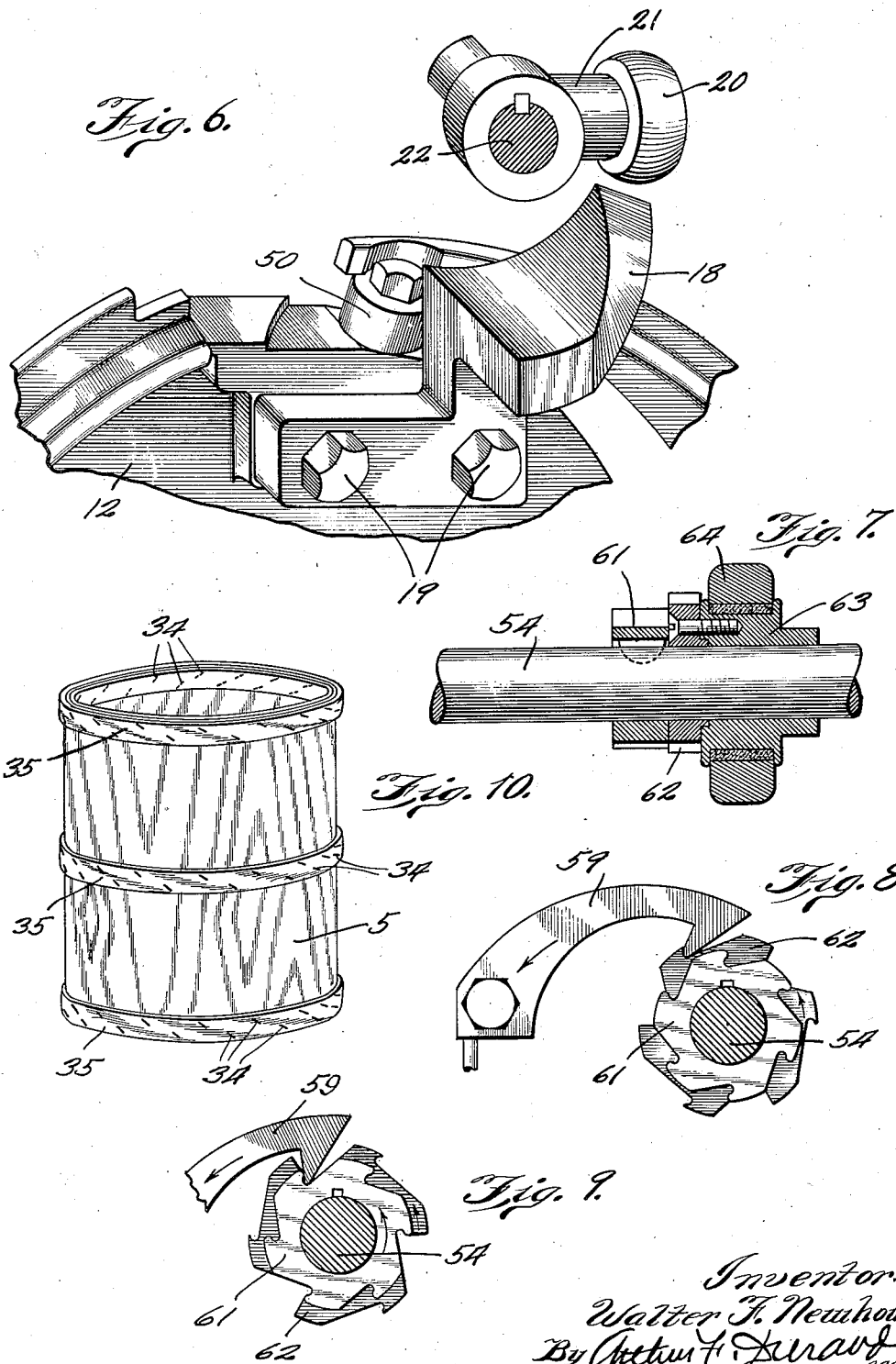

2,000,569

UNITED STATES PATENT OFFICE 2,000,569

MACHINE FOR MAKING BARRELS

Walter F. Newhouse, Benton Harbor, Mich.

Application February 3, 1933, Serial No. 655,057

37 Claims. (Cl. 1—13.6)

This invention relates to barrel machinery, and more particularly to machinery for making cylindrical barrels of the so-called drum type, barrels of this kind having a cylindrical body provided with hoops and end walls or heads.

Generally stated, the object of the invention is to provide a novel and improved construction and arrangement whereby a machine of this kind is capable of applying hoops to a preformed cylindrical body or drum, by rotating the said cylindrical body, and by bending hoop strips around the rotating body and stapling the hoop strips in place to form the hoops of the cylindrical barrel, in a convenient manner, and by means of a machine tending to expedite and reduce the cost of production of barrels of this particular character.

It is also an object to provide certain details and features of construction and combinations tending to increase the general efficiency and the desirability of a barrel-making machine of this particular character.

To the foregoing and other useful ends, the invention consists in matters hereinafter set forth and claimed and shown in the accompanying drawings, in which—

Fig. 1 is a transverse vertical section on line 1—1 in Fig. 2, showing a barrel machine involving the principles of the invention.

Fig. 2 is a horizontal section on line 2—2 in Fig. 1, looking upward in the direction indicated by the arrows.

Fig. 3 is a longitudinal vertical section on line 3—3 in Fig. 1 of the drawings.

Fig. 4 is a transverse vertical section on line 4—4 in Fig. 3 of the drawings.

Fig. 5 is a perspective of certain portions of the machine.

Fig. 6 is a similar view showing the same parts in different positions.

Fig. 7 is an enlarged detail section on line 7—7 in Fig. 4 of the drawings.

Fig. 8 is an enlarged detail view of one of the ratchet devices for feeding the wire from which the staples are made.

Fig. 9 is a similar view, showing the ratchet parts in different positions.

Fig. 10 is a perspective of a finished barrel of the kind made on said machine.

As thus illustrated, the invention comprises a machine frame 1 of any suitable known or approved character, adapted to support the various operative parts in suitably elevated positions. A shaft 2, mounted in suitable bearings on said frame, is adapted to be rotated by power, through the medium of any suitable power-transmitting connection. This shaft is provided with disks or wheels 3, each wheel having a peripheral rim or tread portion 4 of a character to suitably engage the inner surface of the barrel side walls 5, as shown more clearly in Fig. 3 of the drawings. The sheet material is preferably first rolled into cylindrical form, and secured in that condition by a double row of staples (not shown), extending longitudinally along one side of the cylinder, thereby to secure the overlap together. This preliminary barrel drum is then placed on the treads 4 of the wheels 3, in the manner shown, with the inner end of the drum in engagement with the wall 6, secured to the machine body. The bottom head or end wall 7 of the barrel, preferably comprising end wall material secured to a hoop, is then placed in the other end of the barrel drum or cylinder, in the manner shown in Fig. 3, against the clamp 8, which latter is rotatably supported by the bracket 9 on the reduced end portion 10 of the said shaft 2, previously mentioned. Spring devices 11 connect the bracket 9 with the clamping plate 8, whereby the latter is yieldingly pressed against the inner side of the barrel head.

At the outer end of the barrel, a swinging gate 12 is arranged in position, being mounted on a hinge 13, whereby this gate is adapted to swing about a vertical axis. Said gate is provided with a bearing 14, in which is mounted the stem or stud 15 of the clamping disk 16, which latter is adapted to bear against the barrel head, with its axis portion 15 in alignment with the axis of the shaft 2, whereby this shaft and the wheels 3 and the disk 16 will rotate about a common axis, when the said shaft is operated by power. Preferably, the wheels 3 are splined on the shaft 2, so that these wheels can be adjusted toward and away from each other, thereby to adapt the barrel form or support thus provided for barrels of different lengths. Rollers 17, adjustably mounted on the gate 12, are disposed in position to engage the circular rim of the barrel, thereby to maintain the axis of the barrel in fixed position during the rotation of the same, as will hereinafter more fully appear.

A cam bracket 18 is secured by bolts 19 to the gate 12, in position to be engaged by the roller 20, which latter is rotatably mounted on the end of an arm 21, which latter is in turn radially mounted on the rock shaft 22, which latter is arranged parallel with the shaft 2 and supported in bearings on the main body frame. The said shaft 22 is provided with a hand-lever 23 for rocking the shaft, thereby to force the roller into engagement with the cam 18, thereby locking the gate 12 in closed position against the bottom end of the barrel.

Means are also provided in the form of rollers 24, secured to the lower ends of the bracket arms 25, which latter are mounted to slide up and down in the bracket plates 26, secured to the stationary and longitudinally arranged beam 27. Each bracket arm 25 has a vertically reciprocating rod 28, with a spring 29 thereon. The lower end of this rod is connected to a rack 30 for engagement with the pinion 31 on the shaft 22, previously mentioned. Therefore, when the shaft 22 is rocked by means of the lever 23, in a direction to move the racks 30 downward, the springs 29 are compressed against the upper ends of the bracket arms 25, and the latter are thereby yieldingly forced downward, causing the rollers 24 to firmly engage the upper portion of the barrel drum at points directly over two of the wheels 3, thereby to hold the drum firmly down in position on the barrel form or support, as shown in Figs. 1 and 3 of the drawings. Thus, the lever arm 23 not only controls the locking device 18 and 20, to lock or release the gate 12, but also controls the rollers 24 which hold the barrel cylinder down in place during the rotation thereof. In this way, a barrel form or support, of less diameter than the average barrel, is employed to rotate the barrel, in order that the necessary staples may be driven therein. It will be seen that in this way, barrels of different diameters can be made on this barrel form or support, without any adjustment of the support, so far as diameter is concerned. Of course, if barrels of different lengths are to be made, then the wheels 3, as previously stated, can be adjusted toward and away from each other, by reason of their splined connection with the shaft 2 on which they are mounted.

Double stapler heads 32 are mounted for lateral adjustment on the bar or beam 33, which latter is in turn mounted on any suitable portions of the main body frame, Fig. 2 showing the lower ends of these stapler heads, as in this view it is assumed that the drawing was made from underneath, looking up in the direction of the arrows of line 2—2 in Fig. 1 of the drawings. These stapler heads are double, of course, in order that they may drive the staples 34 through the hoops 35 of the barrel, the staples being staggered in each hoop. The two staplers of each head, in a single casing, are set in relative position, therefore, to drive a staple through one edge portion of the hoop, and to drive another staple through the other edge portion, a little farther along, but the two staples are not driven at the same time. This is because the two staples of each pair are spaced apart a distance circumferentially of the barrel, as well as a distance transversely of the barrel. Thus, obviously, every other staple 34 in the lower end of the barrel engages the inside hoop or liner of the head 7, the rim thereof, (see Fig. 3) and the intermediate staples simply pass through the side walls of the barrel and into the wall 7, if desired.

The means for operating the staplers include the walking beams 36, mounted on the shaft 37, supported at its ends in bearings on the main body frame. These walking beams have their front ends connected by links 38 with the drivers of said stapling heads, it being understood that the staplers may be of any suitable known or approved form, staple-forming and driving mechanism of this kind being well known and requiring no further explanation than the previous statement that each stapler is double, each head comprising two formers and two drivers, together with the other elements necessary in a stapling mechanism of this kind, thereby to form the staples and drive them through the hoops and cylindrical side wall of the barrel. The walking beams 36 are connected together by a shaft 39, and this shaft is connected by a pitman 40 with the eccentric device 41 on the shaft 42, suitably supported in bearings on the body frame, there being suitable power-transmitting means (not shown) for rotating this shaft 42 in suitably timed relation to the other elements of the machine. In this way, the walking beams 36 are rocked in unison, and the three stapling heads are operated in unison thereby, thus driving the staples 34 in the hoops of the barrel, while the latter is being rotated continuously. Each double stapler thus has a single actuating means.

Inasmuch as the rotary feed given the barrel is continuous, it follows that the stapler heads must move a distance with the barrel, each time staples are inserted, or otherwise the staples would be distorted. For this purpose, the beam 33 is preferably mounted on curved bars 43 that slide in curved guides 44, suitably secured to the body frame of the machine. The bars 43 and the guides 44 are curved substantially about the axis of the barrel, which axis is some distance below the axis of the barrel support. Pitmen 45 connect the lower ends of the bars 43 with eccentrics 46 on the shaft 42, previously mentioned. In this way, the curved bars 43 are reciprocated endwise, in their guides 44, whereby the staplers on the beam 33 move on the line of a circle parallel with the curved wall of the barrel, whereby the staplers all move forward a distance during the driving of the staples, and then move backward to normal position as soon as the staples have been fully inserted. The points of the staples are clinched, some of them, on the periphery of the disk 16, and some on the treads or rims 4 of two of the wheels 3, previously mentioned, as shown more clearly in Fig. 3 of the drawings.

The hoop guides 47 are pivoted on the lower ends of the racks 30, by the shaft 48, mounted in the lower ends of said racks, these hoop guides being adapted to receive the hoop strips and guide them into place under the stapler heads 32, whereby the hoop strips are gradually wound around the barrel and stapled in place.

Fig. 5 shows the method of guiding an inside bottom end hoop 49 into position, if preformed barrel heads are not employed. If another form of barrel head is employed, requiring the feeding of an inside hoop strip to the bottom end of the barrel, then the roller 50, on the gate 12, shown in Fig. 6, is employed to guide the hoop strip 49 into position against the inner side of the rim of the barrel, between the barrel head and the gate 12, and certain of the staples driven through the outside hoop at this end of the barrel will be driven through this inside hoop and clinched on the periphery of the disk 16, previously mentioned. The hoop strip 49, it will be seen, is fed through the opening 51, formed in the said gate, if this method is to be employed. Otherwise, if a preformed bottom head is employed for the barrel, comprising a hoop with barrel head material stapled thereto, the means for guiding the said hoop strip 49 and feeding it into position will not be employed.

Inasmuch as the wire for the staples must be fed to the stapler heads 32 in a manner whereby each head will drive only one staple at a time, notwithstanding the double character thereof, means are provided for feeding two wires to each stapler head, in this required manner, by means of feed rolls 52, operated by the shafts 53 and 54, the ends of these shafts being mounted in the curved bars 43, previously mentioned. Each stapler head has two feed tubes 55 and 56, one for each pair of rolls, whereby two wires are fed alternately to each stapler head. To obtain this alternate feeding of the two wires, a ratchet device 57 is mounted on the shaft 53, and a ratchet device 58 is mounted on the shaft 54, and ratchet dogs 59 and 60 are pivoted on the stationary guides 44, controlled by springs, and disposed in position to engage said ratchet wheels. Thus, the ratchet wheels move with the bars 43, in a back-and-forth manner, and this causes the dogs 59 and 60 to alternately actuate the shafts 53 and 54, causing first one wire of each stapler head to be fed thereto, when the staplers are actuated, then causing the other wire of each head to be fed thereto the next time the stapler heads are actuated to drive staples. Thus, the staple-formers and drivers of each head operate simultaneously, but only one driver and former functions at a time, alternately, whereby each head drives only one staple at a time, thereby to stagger the staples in the barrel hoops, in the manner previously explained.

Figs. 7, 8 and 9 show the details of the ratchet mechanism more clearly, and from this it will be seen that each ratchet device comprises a main ratchet wheel 61, keyed to its allotted shaft, and an auxiliary ratchet wheel 62 loose on said shaft. This auxiliary ratchet wheel is detachably secured to the brake-drum 63, which is also loose on the shaft, it being understood that by "shaft" is meant either the shaft 53 or shaft 54, previously mentioned. The brake-drum 63 is engaged by a brake-band 64, controlled by a spring device 65, whereby the pressure of the brake-band is regulated. With the relative formation of the ratchet wheels, as shown, the ratchet dog of each ratchet device is forced to skip some of the teeth of the wheel 61, so that for one actuation of the bars 43, the device 57 is operated only, and whereby for the next actuation of these bars 43, the device 58 is actuated alone, whereby the wire is first fed in one of the tubes 55 and 56, and is then fed in the other tube, this alternating feeding action of the two wires being caused by the formation of the teeth of the ratchet wheels, and the consequent alternately operative and inoperative engagement of the ratchet dogs therewith, whereby first one ratchet shaft is operated, and then the other. Therefore, as explained, it is true that first one-half of each stapler head functions, and then the other half functions, the two halves thus alternating in driving staples, notwithstanding that the two halves of each stapler head are actuated in unison. The alternate driving of the staples is accomplished by controlling the feed of the two strands of wire to each stapler head, in the manner explained.

Thus, it will be seen that each stapler head 32 is double, so to speak, and that while both halves of each head are actuated in unison, it is nevertheless true that staples are driven alternately by the two halves of each head, whereby only one staple is driven by each head for each vertical reciprocation or actuation thereof. This is because the two strands of wire are fed alternately to the two halves of each stapler head, in the manner explained. In this way, the staples are staggered around the circumference of each exterior hoop of the barrel, in the manner shown and described.

It will also be seen that the machine is easily adjusted for barrels of different lengths, by adjusting the stapler heads on the bar 33, and by adjusting the pressure devices 24 toward and away from each other, on the rock shaft 22, and by adjusting the wire-feeding devices toward and away from each other on the shafts 53 and 54, in a manner that will be readily understood, and by correspondingly adjusting the walking beams 36 toward and away from each other on the shafts 37 and 39, previously described. It has also been explained that the barrel supports 3 are correspondingly adjustable toward and away from each other for this same purpose.

Thus, a single rock shaft 22 is disposed parallel with the axis of the barrel, for the purpose of operating all of the pressure devices 24, and for the purpose of also operating the lock for the gate 12, which lock comprises the cam 18 and the roller 20, previously described.

In effect, therefore, when the stapler heads move with the rotation of the barrel, the stapler heads, in effect, contribute to the feeding motion of the barrel, whereby the barrel has a continuously rotary feeding motion, while the stapler heads have an intermittent or back-and-forth motion, each forward motion of the stapler heads being at the same speed that the barrel is rotating, whereby the staples are driven in moving work without danger of bending or distorting the staples.

It will be seen that the rings or shoes 4 are preferably toothed or serrated on their outer cylindrical surfaces, thereby to more effectively engage the inner surface of the barrel materials. But it will be observed that this toothed or serrated formation is desirable for only the rotary supports that co-operate with the pressure rollers 24 above, and that the rotary supports that are below the staplers have smooth peripheries to clinch the staples.

As shown, the staples 34 are driven in parallel rows, with the heads of the staples oblique in each row.

Looking at Fig. 3 of the drawings, it will be seen that no means are provided for clinching the staples 34 that do not pass through the inside hoop or liner, and it follows that these unclinched staples may extend into the barrel head 7. But the invention is not limited to such method of inserting the staples, and they may be clinched or unclinched, in various ways, depending upon the exact construction of the barrel, without departing from the spirit of the invention.

What I claim as my invention is:

1. In a machine for making cylindrical barrels, the combination of a rotary horizontal shaft provided with a plurality of annular rotary barrel supports adapted to receive a preliminary cylindrical barrel drum thereon, said supports being all of the same diameter, which diameter is less than the inner diameter of the barrel, means for holding the cylindrical upper wall of the barrel drum down upon said barrel supports, so that the axis of said supports is above and in the same vertical plane as the axis of the barrel, means for guiding flat hoop strips to form external hoops of uniform diameter externally of said barrel drum, mechanism for inserting staples downwardly through the hoop strips and the side walls of the barrel drum, with the points of the staples clinched on the top of said rotary supports, and means for rotating said shaft, thereby to rotate the barrel about the longitudinal axis thereof.

2. A structure as specified in claim 1, said rotation of the barrel being continuous, and said stapling mechanism being mounted to move a distance with the barrel, each time staples are inserted in the barrel.

3. A structure as specified in claim 1, said barrel supports being axially adjustable on said shaft, and said stapling mechanism being also correspondingly adjustable, in the plane of the shaft and barrel axis, whereby barrels of different lengths may be made on said machine.

4. A structure as specified in claim 1, said stapling mechanism comprising a double stapler head for each barrel hoop, each head adapted to drive a pair of staples one after the other in succession, thereby to locate the staples in staggered relation on the circumference of each hoop.

5. A structure as specified in claim 1, said stapling mechanism comprising a double stapler head for each barrel hoop, each head adapted to drive a pair of staples one after the other in succession, thereby to locate the staples in staggered relation on the circumference of each hoop, together with wire-feeding mechanism operative to feed wire alternately to the two halves of each double stapler head, together with means for operating both halves of each head in unison, whereby staples are driven alternately by the two halves of each head, so that each head is operative to drive only one staple at a time.

6. A structure as specified in claim 1, said rotary feed of the barrel being continuous, and means whereby said stapler heads move a distance with the barrel each time staples are inserted therein, and then move back to normal position, together with wire-feeding devices operated by the back-and-forth motion of the stapler heads to feed a plurality of strands of wire to each stapler head, alternately, each stapler head having means whereby said feeding of the wire is operative to stagger the staples around the circumference of each barrel hoop.

7. A structure as specified in claim 1, comprising means for holding a bottom head in the end of the barrel drum, in position to be fastened in place by some of the staples inserted through the adjacent outer hoop.

8. A structure as specified in claim 1, comprising means for holding a bottom head in the end of the barrel drum, in position to be fastened in place by some of the staples inserted through the adjacent outer hoop, said barrel head positioning means comprising a swinging gate adapted to be opened and closed to permit insertion and removal of the barrels, and a locking device for said gate; a longitudinal rock shaft, and means whereby said locking device and said means for holding the barrel down on said supports are simultaneously controlled by manual rocking motion of said rock shaft.

9. A structure as specified in claim 1, said means for holding the barrel down on said supports comprising a bracket provided with rollers to engage the barrel, a vertical guide for said bracket, whereby said bracket is movable up and down, a rock shaft having a rack and pinion for each bracket, with a yielding spring connection between each rack and pinion and its allotted bracket, and means for manually rocking said rock shaft, thereby to raise and lower said rollers.

10. A structure as specified in claim 1, said mechanism comprising a plurality of double stapler heads, together with wire-feeding means whereby the two halves of each stapler head are operative to insert staples alternately, together with means including a rock shaft and walking beams thereon whereby the two halves of each stapler head are actuated in unison, whereby the staples are driven in staggered relation around the circumference of each hoop.

11. In a stapling machine, the combination of a double stapler head, all within one single casing, means for actuating the two halves of the head in unison, means for feeding two strands of wire alternately to the two halves of said head, whereby the head is operative to drive only one staple at a time, in rows extending parallel, with the members of one row alternating with the members of the other row, and with the heads of said staples all extending obliquely of said rows, in the same direction, and work-supporting means for presenting and feeding a strip in position to receive the rows of staples between the side edges thereof.

12. A structure as specified in claim 11, including means for giving said work-supporting means a continuous feeding motion, about a fixed axis, together with means whereby said stapler head moves a distance about said axis with the work each time a staple is inserted, and means whereby said wire-feeding means are operated automatically by return motion of the stapler head.

13. A structure as specified in claim 11, comprising feeding means whereby the work support and said stapler head move in unison substantially about a common axis, with the work always rotating in one direction, and with said stapler head moving first in one direction and then in the opposite direction, whereby said stapler head has an intermittent motion tending through the staples to contribute to the feeding motion of the work.

14. In a stapling machine, the combination of a double stapler head in a single casing set in position to drive the staples with their heads all extending at the same angle obliquely in parallel rows, a single means for actuating the two halves thereof in unison, and wire-feeding devices operative to feed wire alternately to the two halves of said stapler head, whereby a single staple only is driven for each forming and driving stroke of the stapler head.

15. In a barrel machine, the combination of means for supporting and rotating the barrel, a vertically movable member provided with roller means for engaging the upper side wall of the barrel, to hold the barrel down, a rock shaft disposed parallel with the axis of the barrel, a rack and pinion connection between the rock shaft and the vertically movable member, spring means applied to said connection, and means for rocking said shaft, whereby to cause said roller means to apply yielding pressure to the barrel.

16. A structure as specified in claim 15, in combination with a swinging gate adapted to be opened and closed to permit the barrels to be inserted and removed from the machine, a locking device for said gate, and means whereby said locking device is automatically controlled by the rocking of said rock shaft, whereby both said gate and said means for pressing down on the barrel are simultaneously releasable when the barrel is finished.

17. In a machine for making barrels, the combination of a rotary barrel support, a swinging gate for holding the barrel head in place to be secured within the barrel, means for retaining the gate in closed position, a pressure device for exerting pressure on the side of the barrel, to hold the barrel in position, and means whereby said pressure device and said gate-retaining device are simultaneously controllable, said common controlling means being operative about an axis extending parallel with the axis of the barrel.

18. In a machine for making barrels, the combination of means for supporting the barrel, a swinging gate for holding a barrel head in position within the barrel, adapted to be opened and closed to permit the barrels to be inserted and removed from the machine, a rock shaft extending parallel with the axis of the barrel, a cam on said gate, and means carried by said rock shaft for engaging said cam, together with means for rocking said rock shaft, whereby to engage and disengage said cam.

19. In a machine for making barrels, the combination of feeding means for supporting the barrel to rotate about a horizontal axis, having an axis parallel with and in the vertical plane of the axis of the barrel, a plurality of pressure devices movable up and down in said plane to engage and disengage the upper side of the barrel, to press the upper side wall of the barrel down upon said supporting means, a rock shaft extending parallel with the axis of the barrel, means for connecting said rock shaft with said pressure devices, means for rocking said rock shaft, thereby to simultaneously raise and lower said pressure devices, and staplers alternating with said devices in said plane.

20. A structure as specified in claim 19, said pressure devices being adjustable toward and away from each other along said rock shaft, thereby to accommodate barrels of different lengths.

21. A structure as specified in claim 19, said pressure devices being adjustable toward and away from each other along said rock shaft, thereby to accommodate barrels of different lengths, said staplers being mounted independently of said pressure devices to insert staples in the side wall of the barrel, said staplers being also adjustable toward and away from each other.

22. In a machine for making barrels, the combination of barrel-supporting means for supporting a cylindrical barrel in position to rotate about a horizontal axis, means to feed flat hoop strips to the outer cylindrical surface of the barrel, to form flat exterior hoops of uniform diameter, staplers disposed above the hoops, means for causing the staplers to insert staples in staggered relation in each hoop, through the side walls of the barrel, and means for rotating the barrel in timed relation to the means for staggering the staples around the circumference of each hoop.

23. In a barrel machine, the combination of a rotary horizontal shaft, rotary supports on said shaft, of less diameter than the inner diameter of the barrel, to support the barrel in position for rotation about an axis parallel with and below and in the vertical plane of the axis of said shaft, staplers co-operating with one or more of said supports to insert staples through the side walls of the barrel, rollers co-operating with one or more of the supports to grip and rotate the barrel, with teeth for the periphery of any support that co-operates with a roller, thereby to effectively engage the inner surface of the barrel, and one or more of said supports serving to clinch staples.

24. A structure as specified in claim 23, the rotary supports that co-operate with the staplers having peripheries adapted to clinch the staples smooth on the inner surface of the barrel.

25. In a barrel machine, the combination of a rotary ring of less diameter than the barrel, to support the barrel for rotation about a horizontal axis below and in the vertical plane of the axis of said ring, teeth on said ring to engage the inner surface of the barrel, and means in said plane engaging the outer surface of the barrel to press the side walls downwardly against said teeth, racks and pinions for operating said engaging means up and down, said pinions having a common axis extending parallel with the axis of the barrel, together with means in said plane operating on the barrel at intervals during the rotation thereof, and means for positively rotating said ring.

26. In a machine for making cylindrical barrels, the combination of a rotary horizontal shaft provided with a plurality of annular barrel supports, adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said rotation of the barrel being continuous, and said stapling mechanism being mounted to move a distance with the barrel, each time staples are inserted in the barrel.

27. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said stapling mechanism comprising a double stapler head for each barrel hoop, each head adapted to drive a pair of staples one after the other in succession, thereby to locate the staples in staggered relation on the circumference of each hoop.

28. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said stapling mechanism comprising a double stapler head for each barrel hoop, each head adapted to drive a pair of staples one after the other in succession, thereby to locate the staples in staggered relation on the circumference of each hoop, together with wire-feeding mechanism operative to feed wire alternately to the two halves of each double stapler head, together with means for operating both halves of each head in unison, whereby staples are driven alternately by the two halves of each head, so that each head is operative to drive only one staple at a time.

29. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said rotary feed of the barrel being continuous, and means whereby said stapler heads move a distance with the barrel each time staples are inserted therein, and then move back to normal position, together with wire-feeding devices operated by the back-and-forth motion of the stapler heads to feed a plurality of strands of wire to each stapler head, alternately, each stapler head having means whereby said feeding of the wire is operative to stagger the staples around the circumference of each barrel hoop.

30. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples downwardly through the hoop strips and the side walls of the barrel drum, and means for rotating said shaft, thereby to rotate the barrel about the longitudinal axis thereof, comprising means for holding a bottom head in the end of the barrel drum, in position to be fastened in place by some of the staples inserted through the adjacent outer hoop.

31. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, comprising means for holding a bottom head in the end of the barrel drum, in position to be fastened in place by some of the staples inserted through the adjacent outer hoop, said barrel head positioning means comprising a swinging gate adapted to be opened and closed to permit insertion and removal of the barrels, and a locking device for said gate, a longitudinal rock shaft, and means whereby said locking device and said means for holding the barrel down on said supports are simultaneously controlled by manual rocking motion of said rock shaft.

32. In a machine for making cylindrical barrels, the combination of a rotary horizontal shaft provided with a plurality of annular barrel supports, adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said means for holding the barrel down on said supports comprising a bracket provided with rollers to engage the barrel, a vertical guide for said bracket, whereby said bracket is movable up and down, a rock shaft having a rack and pinion for each bracket, with a yielding spring connection between each rack and pinion and its allotted bracket, and means for manually rocking said rock shaft, thereby to raise and lower said rollers.

33. In a machine for making cylindrical barrels, the combination of a rotary horizontal shaft provided with a plurality of annular barrel supports adapted to receive a preliminary cylindrical barrel drum thereon, said supports being all of the same diameter, which diameter is less than the diameter of the barrel, means for holding the cylindrical upper wall of the barrel drum down upon said barrel supports, means for guiding flat hoop strips to form external hoops of uniform diameter externally of said barrel drum, mechanism for inserting staples through the hoop strips and the side walls of the barrel drum, and means for rotating said shaft, thereby to rotate the barrel about the longitudinal axis thereof, said mechanism comprising a plurality of double stapler heads, together with wire-feeding means whereby the two halves of each stapler head are operative to insert staples alternately, together with means including a rock shaft and walking beams thereon whereby the two halves of each stapler head are actuated in unison, whereby the staples are driven in staggered relation around the circumference of each hoop.

34. In a barrel machine, the combination of a rotary horizontal shaft, rotary supports on said shaft, of less diameter than the inner diameter of the barrel, to support the barrel in position for rotation about an axis parallel with and below the axis of said shaft, staplers co-operating with one or more of said supports to insert staples through the side walls of the barrel, rollers co-operating with one or more of the supports to grip and rotate the barrel, with teeth for the periphery of any support or supports co-operating with the roller or rollers, thereby to effectively engage the inner surface of the barrel, the rotary supports that co-operate with the staplers having peripheries adapted to clinch the staples smooth on the inner surface of the barrel.

35. In a stapling machine, the combination of a double stapler head, all within one single casing, means for actuating the two halves of the head in unison, means for feeding two strands of wire alternately to the two halves of said head, whereby the head is operative to drive only one staple at a time, in rows extending parallel, and rotary work-supporting means for presenting and feeding a strip in position to receive the rows of staples between the side edges thereof, said stapler head having the two halves thereof disposed in position to stagger the staples obliquely on the strip.

36. In a stapling machine, the combination of a double stapler head, all within one single casing, means for actuating the two halves of the head in unison, means for feeding two strands of wire alternately to the two halves of said head, whereby the head is operative to drive only one staple at a time, in rows extending parallel, and work-supporting means for presenting a strip in position to receive the rows of staples between the side edges thereof, including means for giving said work-supporting means a continuous feeding motion, about a fixed axis, together with means whereby said stapler head moves a distance about said axis with the work each time a staple is inserted, and means whereby said wire-feeding means are operated automatically by return motion of the stapler head.

37. In a barrel machine, the combination of a rotary horizontal shaft, rotary supports on said shaft, of less diameter than the inner diameter of the barrel, to support the barrel in position for rotation about an axis parallel with and below the axis of said shaft, staplers co-operating with one or more of said supports to insert staples through the side walls of the barrel, rollers co-operating with one or more of the supports to grip and rotate the barrel, with teeth for the periphery of any support that co-operates with a roller, thereby to effectively engage the inner surface of the barrel, the rotary supports that co-operate with the staplers having peripheries adapted to clinch the staples smooth on the inner surface of the barrel.

WALTER F. NEWHOUSE.